United States Patent [19]

Abel

[11] Patent Number: 5,582,744
[45] Date of Patent: Dec. 10, 1996

[54] PRESSURIZED FILTRATION

[75] Inventor: Albert E. Abel, Powell, Ohio

[73] Assignee: A. L. Sandpiper Corporation, Columbus, Ohio

[21] Appl. No.: 279,354

[22] Filed: Jul. 25, 1994

[51] Int. Cl.⁶ .................................................. B01D 29/54
[52] U.S. Cl. ........................ 210/808; 210/323.2; 210/446; 210/497.1
[58] Field of Search ..................................... 210/787, 808, 210/323.2, 340, 354, 356, 416.1, 446, 497.1

[56] References Cited

U.S. PATENT DOCUMENTS

| | | | |
|---|---|---|---|
| 2,819,800 | 1/1958 | Goodloe | 210/323.2 |
| 3,030,302 | 4/1962 | Turnbull | 210/497.1 |
| 3,280,979 | 10/1966 | King | 210/340 |
| 3,527,351 | 9/1970 | Wade | 210/356 |
| 3,644,103 | 2/1972 | Yoon et al. | 210/189 |
| 4,322,293 | 3/1982 | Morgan, Jr. | 210/323.2 |
| 4,713,174 | 12/1987 | Zievers et al. | 210/323.2 |
| 4,783,259 | 11/1988 | Wade | 210/497.1 |
| 4,804,481 | 2/1989 | Lennartz | 210/497.1 |

Primary Examiner—Peter A. Hruskoci
Assistant Examiner—Theodore M. Green
Attorney, Agent, or Firm—Thomas S. Baker, Jr.

[57] ABSTRACT

Apparatus and method steps are provided for accomplishing the pressurized filtration of a slurry mixture to separate a liquid solvent constituent from a particulate solids constituent having particles with varied particle average diameters. The apparatus makes use of a novel generally-helical array of stiff-wire brush bristles contained within, and retained in position by, the frictional engagement with the interior surface of a cooperating tube-like, open-ended array peripheral enclosure.

12 Claims, 1 Drawing Sheet

U.S. Patent   Dec. 10, 1996   5,582,744
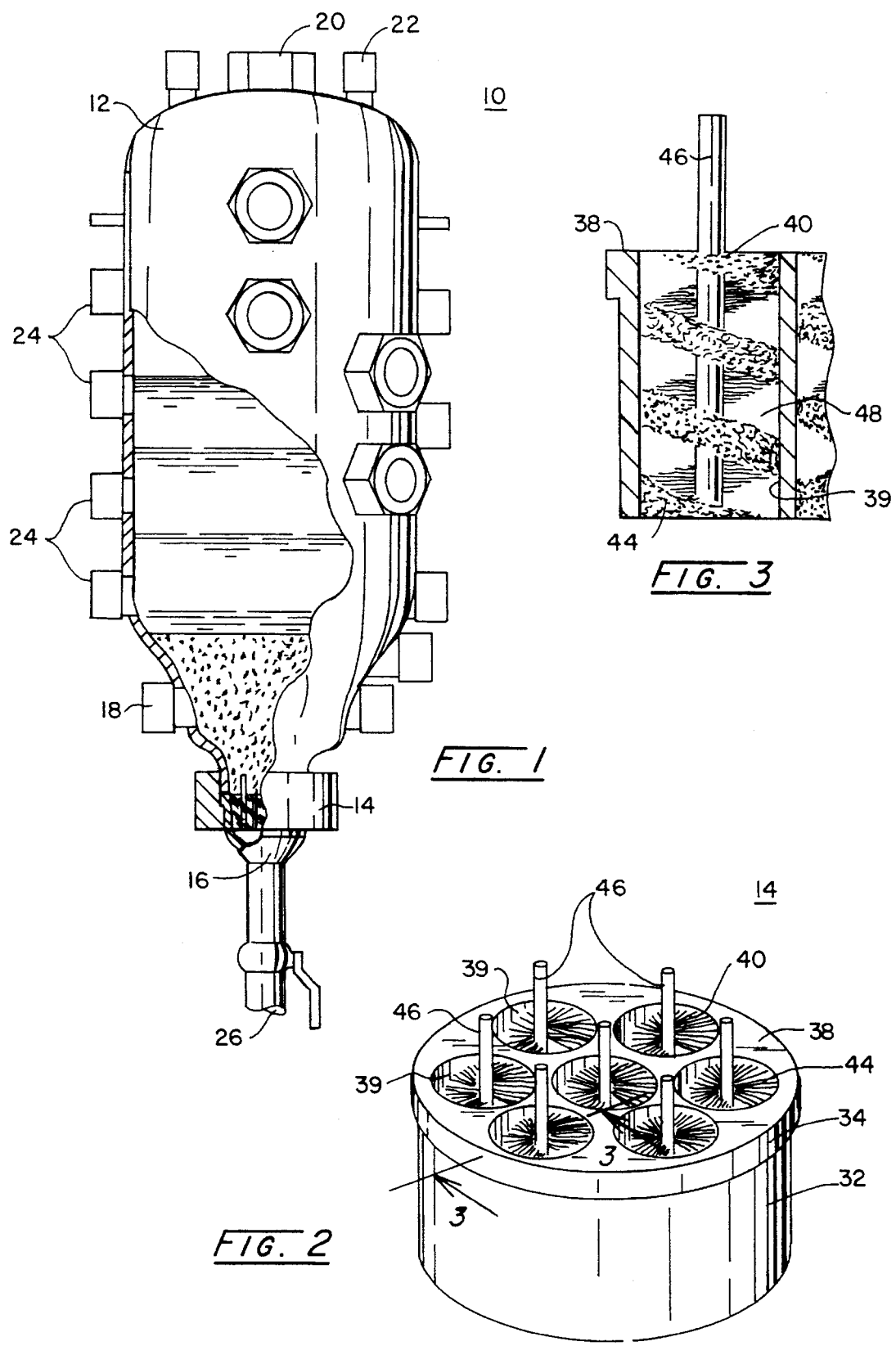

PRESSURIZED FILTRATION

FIELD OF THE INVENTION

This invention relates to pressurized filtration generally, and particularly concerns both filter apparatus and filtration method steps which may be advantageously utilized in processes involving the separation of solvent in its liquid phase from a pressurized slurry mixture of solvent and particulate solids.

BACKGROUND OF THE INVENTION

The treatment of soils contaminated with halogenated organic compounds such as polychlorinated biphenyl compounds (hereinafter PCB's) with solvated electron solutions for soil decontamination purposes is disclosed in U.S. Pat. Nos. 4,853,040 and 5,110,364 issued in the names of Mazur et al. Although quite effective as a method for decontaminating PCB-contaminated soils, the prior art processes sometimes can be economically disadvantageous because of the problems associated with the separation of solvent from treated soil. In the case of those prior art processes, which processes use anhydrous liquid ammonia as a solvent, the economic disadvantages arise out of the use of solvent evaporation as the preferred method of separating ammonia solvent from the treated solids.

Vaporization of solvent as a means of effecting solvent separation from a solvent-treated soil is undesirable for several reasons. First, vaporization is a relatively slow process and results in slow process batch turn-around time. Second, vaporization requires substantial amounts of process heat input, thereby resulting in an unacceptably large energy economic penalty for solvent recovery. Third, vaporization recovery requires the use of expensive compression, condensation, and chilling equipment to thereby avoid the necessity of either venting or destroying the process ammonia. Also, vaporization of liquid ammonia can cause the process temperature of both the liquid ammonia and treated soil to drop because of the accompanying ammonia refrigeration effect. Such, if substantial, can result in freezing of the soil, ice formation on the process reactor vessel, and unacceptable thermal stresses in the entire soil treatment system.

Separation of the ammonia solvent, while in the liquid phase, from the treated soil, presents a unique set of problems that differs from the set of problems associated with solvent separation by evaporation. Known liquid separation approaches include the use of such mechanisms as filter belt presses, centrifuges, decanting systems, and conventional filters. Each such approach, however, is unsatisfactory in comparison to the present invention for one or more reasons.

For instance, filter belt presses are normally designed for ambient (atmospheric) pressure operation and typically leave from five to fifteen weight percent of solvent liquid in the treated soil. Although equipment design modifications for pressurized operation might be effected, such would greatly increase the complexity of, and cost associated with, liquid solvent separation.

Centrifuges, on the other hand, are able to achieve significantly higher levels of liquid removal than filter belt presses, but are disadvantageous in that they require pressurized rotary seals, substantial drive motors, higher capital equipment investment, and increased maintenance and repair costs.

In the case of decanting systems, only free-standing liquid is typically removed and thus essentially dry cake recovery is unobtainable. Lastly, conventional filters are not designed to separate liquids from slurries containing substantial quantities of a non-homogenous particulate material. Representative soils to which pressurized decontamination treatment and solvent separation using the present invention pertains, have particle sizes in the range from below 0.002 millimeter average diameter to as much as 2 millimeter average diameter with a requirement that the filtration process screen out those soil particles which are at the low size end of the soil particle size spectrum. Because a large percentage of the material to be separated is typically substantially larger than the smallest particle size, filter clogging is a major potential problem and effectively precludes the use of conventional filters for the soil treatment and liquid solvent separation application.

My invention avoids the above-discussed economic constraints associated with the conventional technical approaches to solvent removal from treated soil/solvent mixture slurries, and does so in a clearly cost-effective manner.

SUMMARY OF THE INVENTION

To attain the objectives of the present invention I provide a process system with a pressure vessel having a plurality of inlet/outlet ports, which ports may be selectively opened for use in charging a slurry mixture or removing process material and solvent constituents, and with one or more (depending upon required process material flow rates) twisted, wire-bristle brush filter elements that each function to screen and retain treated particulate solids within the pressure vessel separate from process slurry liquid solvent passed through the filter elements for subsequent collection and reuse or discard. The system brush-type filter elements are typically installed in a removable or accessible pressure vessel filter section in proximity to the pressure vessel liquid solvent discharge port.

Each such filter element is positioned in the equipment filter section within an open-ended, tube-like filter element peripheral enclosure having a cross-sectional configuration that is similar to but slightly smaller in size than the cross-sectional configuration of the brush-type filter in its uninstalled or uninserted condition.

Each brush-type filter element basically is comprised of an array of relatively stiff metal wires that extends along the longitudinal axis of its tube-like peripheral housing, with the individual metal wires in the array having essentially a radial orientation relative to the cross-sectional center of the element peripheral housing. Thus, adjacent individual wires in the array have a relative separation that varies and increases generally in proportion to their cross-sectional distance from the filter element cross-sectional center thereby giving the filter element its non-uniform porosity characteristic. This variable-separation characteristic also provides the filter element with a "relief-valve" characteristic that minimizes potential filter clogging as later described in the detailed specification which follows.

The filter element metal wires in the array also essentially form a helical, and somewhat convoluted, "passage" in the filter element extending along the longitudinal axis filter element and of the element tube-like peripheral housing. This characteristic of the non-uniformly porous filter element is the result of a conventional method of filter element manufacture in which the individual wire bristles are secured in a twisted-wire center prior to trimming the ends of the brush bristles to a relatively uniform cross-sectional radius. As will be detailed hereinafter, in one actual embodiment of this invention the preferred individual filter brush components comprise the end portions of nominally one-half inch diameter conventional plumber's wire bristle brushes severed from their respective handles; the brush/handle combination is otherwise generally utilized by plumbers for removing scale from within corroded fluid lines. The variable separation between bristles functioned to retain and capture slurry solid particles having average diameters in the range from less than approximately 0.002 millimeter to as much as approximately 2 millimeters thereby assisting in forming a solvent-free dry soils cake in the pressure vessel without attendant filter clogging and blockage of liquid solvent flow.

In addition to the ability of my invention to successfully separate non-homogenous, particulate solids from liquid-phase solvent systems, my invention represents a major improvement over conventional filters and filtration systems in that the filtration elements are incapable of becoming plugged, can be readily cleaned with running water, and is effectively, infinitely reusable.

Other advantages associated with my invention will become apparent from a careful consideration of the drawings and detailed description which follow.

DESCRIPTION OF THE DRAWINGS

FIG. 1 is a schematic elevational view, partially sectioned, of a batch process pressure vessel having an improved filter section for separating non-uniformly sized solids particles in a slurry from slurry liquid solvent;

FIG. 2 is a perspective view of the pressure vessel filter section of the apparatus of FIG. 1 illustrating included multiple helical brush filter elements; and FIG. 3 is a sectioned partial elevational view taken along line 3—3 of FIG. 2.

DETAILED DESCRIPTION

FIG. 1 schematically illustrates a batch process filtration system (10) which is basically comprised of a pressure vessel section (12), a filter section (14) removably joined to the pressure vessel section, and a solvent collector section (16) cooperatively joined to filter section (14). As indicated above, system (10) has been utilized to accomplish the separation of the liquid solvent constituent of a slurry mixture from the slurry solids particles constituent, and more particularly the removal of nominally-anhydrous liquid ammonia from soil particles previously treated for the removal of PCB contamination. The apparatus and method aspects of my invention essentially concern and relate to the functioning of later-described filter section (14).

In its representative configuration, pressure vessel section (12) is supported on structural base member (18), is provided with a slurry inlet port (20) which cooperates with slurry transfer line (22), and also is provided with multiple outlet ports (24) which may be selectively opened after the batching process is completed to accomplish the removal of separated solids particles. Slurry transfer line (22) is preferably provided with a selectively operated shut-off valve (not shown) for use in maintaining process pressure during the hereinafter described method step of pressurized filtration.

Apparatus liquid solvent collector section (16) is cooperatively connected to solvent discharge line (26) which, like line (22), also is provided with a shut-off valve. Further, and although not illustrated in sectional or configurational detail, apparatus (10) is provided with removable conventional pressure seals which function to connect filter section (14) to pressure vessel (12) and to solvent collector section (16) in a pressure-sealed relation.

As best illustrated in FIG. 2, apparatus filter section (14) is basically comprised of an annular exterior shell member (32) provided with at least one integral flange portion (34) for cooperation with the aforementioned pressure seals. A drilled plate member (which is roughly as thick as the brush is long) (38) is joined at its periphery to annular shell member (32) in sealing relation thereto. Plate member (38) has a plurality of bores (39) and each receives a filter element (40). As shown in FIG. 3, each filter element (40) is comprised of a helically twisted, stiff-wire, bristle-brush like component (44) mounted on a central shaft element (46). Each filter element (40) is inserted into, movably restrained by frictional engagement with, and axially co-extensive with the walls defining bore (39). The helically-twisted, stiff, metal wire brush component (44) of filter component (40) is preferred in the practice of this invention for filtering solvent from liquid ammonia and soil slurries. Component (44) has a volumetric density, when installed in its bore (39), of approximately twenty percent. That is to say that the net volume of the brush component (44) comprises that percentage of the volume of its bore (39).

The above-described bristle-brush filter element (40) has been used repeatedly to separate ammonia from soil while retaining essentially all of the soil, including very fine particles. From a theoretical standpoint, it is speculated that the brush element provides a support framework where large soil particles lodge and form a secondary support framework for subsequent, smaller particles until a sufficiently fine total filtering framework is provided so that even the finest of soil particles are captured.

An additional, and unexpected, feature of the present invention is the built-in "relief valve" characteristic that the brush filter element appears to develop. In conventional filters, for instance, particles lodge against openings in the filter medium, partially cutting off flow of the solvent through the filter. As particles accumulate, the flow can be restricted until it is totally blocked because the bed cannot "shift" as the pressure increases. In the case of the present invention, as a large particle of soil is pressed against the filter, it becomes supported by the bristles and begins providing support for smaller particles above it. However, if the flow becomes restricted and pressure begins to increase over the filter, the wire bristles can "give" because of their limited resiliency and cause the particle to pass through to the next level of bristles where it will likely be caught and begin providing a new base for filter bed formation. By allowing this slight "shifting" of the filter bed the system can re-stabilize and restore the flow of fluid.

Additionally, in some instances the spiral path (48) created by the volume adjacent helical component (44) of brush (40) enables particles as large as 2–3 mm to pass through the brush (40) when flow becomes restricted and system pressure increases. Yet the brush successfully captures and retains particles of 0.002 mm and smaller with retention efficiencies of 98% or greater.

In the present invention, nominally anhydrous ammonia is the liquid phase which must be separated from the non-homogenous particulate solids. At ambient temperatures in the range of 0° C. to 40° C., liquid ammonia has a vapor pressure in excess of one atmosphere. This vapor pressure can be used as the means for forcing ammonia through the filter bed comprised of filter components (40). Alternatively, a pressurized gaseous medium having a pressure in the range of 5 to 120 psi may be introduced into pressure vessel (12) following the introduction of process slurry into the vessel and closure of slurry inlet line (22). In the process examples where liquid slurry containing soil was passed through a filter bed comprised of a plurality of parallel arranged filter components (40) reported below, gas pressures in the range of approximately 20 to 30 psi were utilized.

EXAMPLE 1

Five hundred grams of Tennessee red clay (Mechanical Analysis: approximately 1% of 0.05 to 2.0 mm sand, approximately 26% of 0.002 to 0.05 mm silt, and approximately 73% of below 0.002 mm clay) were slurried with approximately 4,000 ml of anhydrous liquid ammonia at approximately 65° F. in a pressure vessel similar to that shown in FIG. 1. Agitation was provided by an external pump which circulated ammonia through the pressurized vessel. Following the addition of approximately 13 grams of calcium metal and additional agitation, the mixture was allowed to settle. Initially, a small quantity of soil (perhaps 10 to 20 grams) was carried out with liquid ammonia. This is not of any consequence since the ammonia is reused in the treatment of succeeding batches in the process. However, once the filter components (40) were "set", i.e. trapped sufficient soil components to cause a filtering action to occur, the ammonia recovered was clear and free of particulate material for the most part. The rate of flow was estimated to be in the range of 50 to 100 ml per minute. Following removal of the ammonia, a solid, readily friable cake of soil was left in the filter elements (40) which rapidly lost its ammonia smell as it was broken up. Approximately 375 grams of soil were recovered from the cake. The balance was lost principally in the reactor piping, the pump, and the vessel.

EXAMPLE 2

Approximately 100 grams of Central Ohio clay loam soil (Mechanical Analysis: approximately 35% of 0.05 to 2.00 mm sand, approximately 32% of 0.002 to 0.05 mm silt, and approximately 33% of 0.002 mm or finer clay) was slurried with 1,000 ml of anhydrous liquid ammonia in a stirred pressure vessel at approximately 65° F. Following treatment of the soil with calcium metal for PCB contaminant destruction, the treated slurry was transferred to a pressure vessel having a helical, stiff, wire-brush filter element (40). The recovered liquid ammonia was clear and colorless with minimal particles of transferred soil once initial purging of the system discharge valve had been completed. Soil loss through the filter element (40) was less than 1%. A dry cake of soil was left in the filter element (40) following separation and removal of the liquid ammonia solvent.

Apparatus shapes, sizes, and materials other than those disclosed in the drawings and detailed description, and other liquid solvent and solid particle constituent slurries, may be utilized in the practice of pressurized filtration according to the present invention without departing from the scope or intent of the claims which follow.

I claim as my invention:

1. A pressurized filtration system comprising:

a pressure vessel having a selectively opened slurry inlet port;

a tube shaped, open-ended peripheral enclosure; and a generally helical array of stiff wire bristles contained within, and retained in position by, said peripheral enclosure.

2. The pressurized filtration system defined by claim 1 wherein said generally-helical array of stiff wire bristles has a net volume which comprises approximately 20% of the volume of the coextensive interior extent of said peripheral enclosure.

3. In a pressurized filtration system, filter section means comprising:

an open-ended filter section shell;

a plate contained within and supported by said filter section shell and having interior surfaces defining multiple cylindrical filter element enclosures therein; and an array of generally-helical, stiff, wire brush bristles contained within, axially co-extensive with and retained in position by frictional engagement with, the interior surface of each of said filter element enclosures.

4. The pressurized filtration system filter section defined by claim 3 wherein the net volume of each said generally-helical array of stiff, wire bristles comprises not more than approximately 20% of the volume of the coextensive interior extent of said peripheral enclosure components.

5. A pressurized filtration system comprising:

a pressure vessel having a selectively opened slurry inlet port;

a collector section having a selectively opened liquid solvent outlet port; and a maintenance-accessible filter section positioned intermediate said pressure vessel and said collector section, and connected to said pressure vessel in pressure sealed relation, said filter section having multiple filter elements each comprised of a tube shaped, open-ended peripheral housing component and of a generally-helical array of stiff-wire bristles contained within, and retained in position by frictional engagement with, said peripheral housing component.

6. The pressurized filtration system defined by claim 5 wherein each said filter element generally-helical array of stiff-wire bristles has a net volume comprising approximately 20% of the coextensive interior extent of its respective one of said peripheral housing components.

7. In a method of separating a slurry liquid solvent constituent from a slurry particulate solids constituent having varied particle size average diameters, the step of subjecting the slurry liquid solvent and particulate solids constituents to a positive isostatic pressure and flowing the liquid solvent constituent but not the particulate solids constituent through at least one filter element comprised of a tube shaped, open-ended peripheral enclosure and a generally-helical array of stiff-wire brush bristles contained within, and retained in position by, the tube shaped, open-ended peripheral enclosure component.

8. The method defined by claim 7 wherein said generally-helical array of stiff-wire brush bristles has a net volume comprising approximately 20% of the volume of the coextensive interior extent volume of the tube-shaped, open-ended peripheral enclosure component.

9. The method defined by claim 7 wherein said isostatic pressure is at a level corresponding to the vapor pressure of the slurry liquid solvent constituent.

10. The method defined by claim 7 wherein said isostatic pressure is at a level in the range of approximately 5 pounds per square inch to 120 pounds per square inch.

11. The method defined by claim 7 wherein said isostatic pressure is at a level in the range of approximately 20 pounds per square inch to 120 pounds per square inch.

12. The method defined by claim 7 wherein said slurry liquid solvent constituent is comprised of nominally anhydrous ammonia, and wherein said particulate solids constituent is comprised of soil particles.

* * * * *